(12) United States Patent
Bischoff

(10) Patent No.: US 6,381,961 B1
(45) Date of Patent: May 7, 2002

(54) METHOD FOR OPERATING A SUPERCHARGED INTERNAL COMBUSTION ENGINE

(75) Inventor: Roland Bischoff, Plüderhausen (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/533,754

(22) Filed: Mar. 23, 2000

(30) Foreign Application Priority Data

Mar. 26, 1999 (DE) .......................... 199 13 792

(51) Int. Cl.⁷ .................. F02B 37/18; F02M 25/07; F02D 21/08
(52) U.S. Cl. ................ 60/605.2; 123/568.18; 123/568.21
(58) Field of Search .............. 60/605.1, 605.2, 60/606; 123/568.11, 568.17, 568.18, 568.21, 568.22

(56) References Cited

U.S. PATENT DOCUMENTS

| 4,328,672 A | * | 5/1982 | Zumstein | 60/605.2 |
| 5,406,796 A | * | 4/1995 | Hiereth et al. | 60/605.2 |
| 6,035,639 A | * | 3/2000 | Kolmanovsky et al. | 60/605.2 |

FOREIGN PATENT DOCUMENTS

| DE | 29 32 083 | 1/1981 |
| DE | 32 25 867 | 1/1984 |
| DE | 3225867 A1 | * 1/1984 |
| DE | 32 44 928 | 6/1984 |
| DE | 33 39 592 | 5/1985 |
| DE | 43 12 077 | 1/1994 |
| DE | 197 28 352 | 8/1998 |
| DE | 197 19 630 | 2/1999 |
| FR | 1 497 428 | 12/1967 |

* cited by examiner

Primary Examiner—Andrew M. Dolinar
Assistant Examiner—Arnold Castro
(74) Attorney, Agent, or Firm—Kenyon & Kenyon

(57) ABSTRACT

When an internal combustion engine supercharged by way of an exhaust-driven turbocharger is operated, compressed charge air is diverted as a function of the operating point of the internal combustion engine, by opening a shutoff valve in an overflow duct, out of a charge air duct leading to the internal combustion engine into an exhaust gas duct to the turbine of the exhaust-driven turbocharger in the presence of a driving pressure drop. In order to optimize supercharging performance over the entire operating characteristics diagram of the internal combustion engine, and decrease the exhaust emissions of the internal combustion engine, provision is made for the overflow duct to be enabled as necessary, for the recirculation of exhaust gas into the charge air duct, when a pressure drop driving toward the charge air duct is present.

8 Claims, 1 Drawing Sheet

METHOD FOR OPERATING A SUPERCHARGED INTERNAL COMBUSTION ENGINE

FIELD OF THE INVENTION

The present invention relates to a method for operating an internal combustion engine supercharged by way of an exhaust-driven turbocharger.

RELATED TECHNOLOGY

The performance of an internal combustion engine can be enhanced by supercharging, i.e. by precompressing the charge air before it enters the cylinders. In an exhaust-driven turbocharger, the compressor in the charge air duct is rotationally driven by a turbine that is arranged in the exhaust gas duct and is acted upon by the exhaust gas flow from the cylinder.

In order to enhance supercharging performance in particular in operating ranges of the internal combustion engine in which the exhaust gas volume is small and the basic torque of the exhaust-driven turbocharger is low, German Patent Application No. 32 44 928 A1 proposes diverting a partial flow of compressed charge air into the exhaust gas duct. The charge air is introduced together with the exhaust gas flow into the turbine, which is therefore accelerated more strongly with a higher air flow rate. Diversion of the charge air occurs in operating ranges of the internal combustion engine in which the supercharging pressure exceeds the exhaust gas pressure of the turbine. To initiate the diversion, a shutoff valve in an overflow duct is opened, and the partial flow of charge air that is to be diverted is driven to the turbine of the exhaust-driven turbocharger by the pressure drop in the overflow duct.

SUMMARY OF THE INVENTION

It is an object of the present invention to create a method for operating an internal combustion engine supercharged by way of an exhaust-driven turbocharger that optimizes supercharging performance over the entire operating characteristics field and decreases the exhaust emissions of the internal combustion engine.

The present invention provides a method for operating an internal combustion engine (1) supercharged by way of an exhaust-driven turbocharger (10), compressed charge air being diverted as a function of the operating point of the internal combustion engine (1), by opening a shutoff valve (8) in an overflow duct (7), out of a charge air duct (5) leading to the internal combustion engine (1) into an exhaust gas duct (6) of the internal combustion engine (1) to the turbine (11) of the exhaust-driven turbocharger (10) in the presence of a driving pressure drop (p2-p3) through the overflow duct (7), wherein when a pressure drop (p2-p3) driving toward the charge air duct (5) is present, the overflow duct (7) is enabled as necessary for the recirculation of exhaust gas into the charge air duct.

In a method according to the present invention, the overflow duct is used as an alternative to the diversion of charge air into the exhaust gas duct or to the recirculation of exhaust gas. With exhaust gas recirculation, exhaust emissions can be effectively decreased in many operating ranges of the internal combustion engine. Exhaust gas recirculation can be accomplished when a pressure drop driving toward the charge air duct exists in the overflow duct, i.e. when the exhaust gas pressure exceeds the supercharging pressure. If the internal combustion engine is to be operated with exhaust gas recirculation, the control valve in the overflow duct is opened, and the exhaust pressure drives a partial exhaust gas flow into the charge air duct. With the method according to the present invention, both charge air diversion and exhaust gas recirculation can be accomplished as required without additional structural complexity.

Advantageously, the flow rate of the overflow duct can be adjusted by varying the opening cross section of the shutoff valve, so that the increase in turbocharger torque (in diversion mode) and the exhaust gas recirculation rate (in exhaust gas recirculation mode) are adjustable. A control unit can ascertain the existing operating point on the basis of an input signal of at least one operating parameter of the internal combustion engine. The control unit then determines the operating mode associated with the particular operating point that has been ascertained (diversion mode or exhaust gas recirculation), and the corresponding flow rate of the overflow duct. The control unit activates the control valve in the overflow duct and establishes the predefined flow cross section.

The respective operating ranges in which diversion on the one hand, and exhaust gas recirculation on the other hand, are possible in accordance with the prevailing pressure drop can be enlarged if the pressure drop through the overflow duct is adjustable by way of a throttling element. Closing the throttling element backs up the exhaust gas flow and increases the exhaust gas pressure. With a corresponding increase in the exhaust gas pressure above the prevailing supercharging pressure, it is thereby possible for exhaust gas to be mixed into the charge air flow, if necessary, even at operating points at which the natural pressure drop prohibits any exhaust gas recirculation. By adjusting the throttling element correspondingly it is equally possible, in order to assist diversion, to establish a pressure drop through the overflow duct which drives the charge air. It is particularly advantageous to use, as the throttling element for the exhaust gas flow, an exhaust-driven turbocharger having a variably adjustable turbine geometry. The control unit can determine the exhaust gas pressure upstream from the turbine by correspondingly adjusting the flow cross section of the turbine, for example by adjusting a variable turbine guide baffle.

An exemplary embodiment of the present invention is explained in more detail below with reference to the drawing.

DETAILED DESCRIPTION

Figure 1:
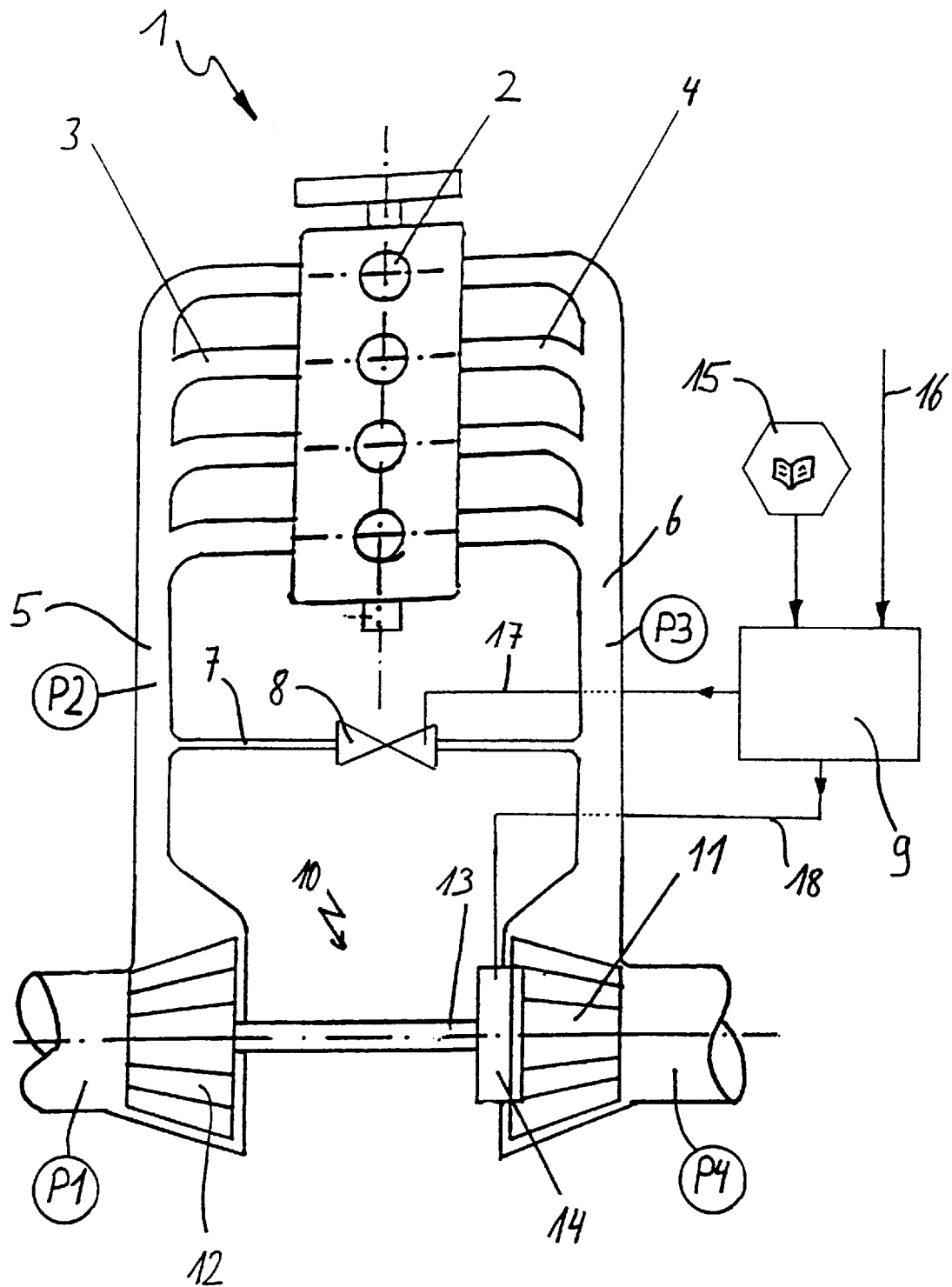
FIG. 1 shows a schematic depiction of an internal combustion engine comprising multiple cylinders and supercharged using an exhaust-driven turbocharger.

Cylinders 2 of internal combustion engine 1 are each supplied via an inlet 3 with precompressed charge air from a charge air duct 5. The exhaust gases of cylinders 2 are respectively discharged through an outlet 4 and a collecting exhaust gas duct 6. Supercharging of internal combustion engine 1 is accomplished via an exhaust-driven turbocharger 10 whose turbine 11 is arranged in exhaust gas duct 6 and is acted upon by the exhaust gas flow. The exhaust gas flow enters turbine 11 at an exhaust gas pressure p3, a rotary motion being imparted to turbine 11 as the exhaust gas pressure decreases to a level p4. By way of a turbocharger shaft 13, turbine 11 drives a compressor 12 that compresses fresh air, entering at a pressure P1, to supercharging pressure P2 in charge air duct 5. Charge air is conveyed through charge air duct 5, via inlets 3, to cylinders 2 of internal combustion engine 1. Turbine 11 has a variably adjustable turbine geometry; for example, an adjustable turbine guide baffle is adjustable by way of an actuating drive 14. By way of the variation in turbine geometry, the flow cross section of turbine 11 is adjustable and thus not only the backing-up effect on the exhaust gas flow of the internal combustion engine, but also the acceleration and torque of exhaust-driven turbocharger 10, can be influenced.

Charge air duct 5 is connected to exhaust gas duct 6, by an overflow duct 7, after compressor 12 in the flow direction; overflow duct 7 terminates before turbine 11 in the flow direction of the exhaust gas. A shutoff valve 8, which can be opened as necessary for overflow between charge air duct 5 and exhaust gas duct 6, is arranged in overflow duct 7. When shutoff valve 8 is open, a partial flow flows out of one of the two connected ducts, driven by the prevailing pressure drop p2-p3, into the other duct. At operating points with a positive pressure drop, in which supercharging pressure p2 exceeds exhaust gas pressure p3, charge air is diverted through overflow duct 7 and mixed in with the exhaust gas flow. The diversion increases the turbine flow rate, thus increasing the supercharging performance of exhaust-driven turbocharger 10 especially at operating points of internal combustion engine 1 with a low exhaust gas volume, for example in the lower ranges of engine speed and load. If a negative pressure drop p2-p3 exists at a higher exhaust gas pressure level, exhaust gas can be recirculated into charge air duct 5 through the overflow opening when shutoff valve 8 is open.

The flow rate of overflow duct 7 can be adjusted by varying the opening cross section of shutoff valve 8. The opening cross section of shutoff valve 8 is adjusted in accordance with the pressure drop p2-p3 at the particularly prevailing operating point, so as to establish the optimum flow rate in diversion mode or in exhaust gas recirculation mode. The diversion air flow rate or exhaust gas recirculation rate is determined by adjusting shutoff valve 8 with a control unit which acts upon the control valve with a corresponding control signal 17. The operating point of the internal combustion engine is ascertained by the control unit from one or more operating parameters 16 of the internal combustion engine, for example the engine speed. It may also be advantageous, however, to input measured values of the supercharging pressure p2 and exhaust gas pressure p3 into control unit 9 in order to ascertain the operating point or as interference variables for the control sequence of shutoff valve 8. Control unit 9 reads from a characteristics diagram 15 the optimum setting parameters stored therein for shutoff valve 8 for the operating point that has been ascertained.

Control unit 9 furthermore controls actuating drive 14 of the variably adjustable turbine geometry. By changing the flow cross section, by way of an adjustment of the turbine geometry, control unit 9 modifies the backing-up effect of turbine 11 and can thereby raise or lower exhaust gas pressure p3. The variable turbine geometry is used as a throttling element acting on the exhaust gas flow. If exhaust gas recirculation is advantageous in order to decrease pollutant emissions, exhaust gas pressure p3 is raised by backing up the exhaust gas flow, and a negative pressure drop p2-p3 in overflow duct 7 is created, driving exhaust gas into charge air duct 5. It is analogously possible to lower exhaust gas pressure p3 if an increase in the diversion air volume is necessary, so that a greater pressure difference p2-p3 drives a greater volume of charge air into exhaust gas duct 6. Control unit 9 coordinates actuating signal 18 for the variable turbine geometry with control signal 17 for the flow cross section of the overflow duct, and thereby establishes the desired air flow rate in the overflow duct (diversion air/recirculating exhaust gas).

The throttling of the exhaust gas flow by adjusting the turbine geometry, and the adjustability of the pressure drop between charge air duct 5 and exhaust gas duct 6, make it possible to switch selectably, over large areas of the characteristics diagram, between diversion mode and exhaust gas recirculation mode.

What is claimed is:

1. A method for operating an internal combustion engine that is supercharged using an exhaust gas-driven turbocharger, the method comprising;

opening a shut-off valve in an overflow duct connecting a charge air duct of the engine to an exhaust gas duct of the engine so as to divert at least a portion of compressed charge air in the charge air duct into the exhaust gas duct and to a turbine of the exhaust driven supercharger, the opening being performed as a function of an operating point of the engine and as a function of a first pressure drop from the charge air duct to the exhaust gas duct; and enabling a recirculation of at least a portion of the exhaust gas from the exhaust gas duct to the charge air duct as a function of the operating point of the engine and as a function of a second pressure drop from the exhaust gas duct to the charge air duct.

2. The method as recited in claim 1 wherein the enabling of the recirculation comprises opening the shut-off valve.

3. The method as recited in claim 2 further comprising varying an opening cross-section of the shut-off valve so as to adjusting a flow rate through the overflow duct.

4. The method as recited in claim 1 wherein a control unit determines the opening and enabling and determines a corresponding flow rate through the overflow duct based on an input signal of at least one operating parameter.

5. The method as recited in claim 4 wherein the opening and enabling are each associated with a respective existing operating point of the engine.

6. The method as recited in claim 1 wherein at least one of the first and second pressure drops are adjustable by way of a throttling element acting on a flow of the exhaust gas.

7. The method as recited in claim 6 wherein a control unit determines a pressure in the exhaust gas duct upstream from the turbine by adjusting a flow cross-section of a variable turbine geometry.

8. The method as recited in claim 4 wherein the control unit, using a characteristics diagram, determines at least one of a flow direction through the overflow duct, the first and second pressure drops, and an opening cross-section of the shut-off valve.

* * * * *